Aug. 10, 1937.  2,089,613
E. J. LEVY, NOW BY JUDICIAL CHANGE OF NAME E. L. MAYO
TEMPERATURE INDICATOR
Filed Nov. 30, 1928

Inventor
Edward Levy Mayo,
By Frank M. ……
Attorney

Patented Aug. 10, 1937

2,089,613

UNITED STATES PATENT OFFICE 2,089,613

TEMPERATURE INDICATOR

Edward J. Levy, Cleveland Heights, Ohio, now by judicial change of name Edward Levy Mayo, assignor, by mesne assignments, to The Anderson Company Application November 30, 1928, Serial No. 322,925

3 Claims. (Cl. 177—351)

My invention relates to temperature indicators and relates particularly to temperature indicators adapted to visually indicate a temperature remotely of the point where the temperature is in effect.

My invention is a particular application to the problem of indicating on an instrument located within the driving compartment of an automotive vehicle, the temperature of the engine cooling or lubricating fluid for the engine propelling the vehicle.

An object of my invention is to provide an indicating system of the above type which, while capable of being provided inexpensively, yet will effect at all times within the desired temperature range, an indication remotely of the fluid whose temperature is to be measured, the temperature thereof, with sufficient accuracy for all practical purposes.

Another object of my invention is to provide in a system of the above type, a controlling element which may be readily applied to the casing containing the fluid whose temperature is to be measured without requiring the projection from the exterior of the casing of apparatus whose operativeness would be impaired by chance blows.

Another object of my invention is to provide an improved system of the above type which is electrically operated, and in which no fluid conduits are required for communication of pressure force induced by temperatures at the engine, to the indicator.

Another object of my invention is to provide a mechanism which is easily susceptible to adjustment to vary the temperature range indicated at the indicator instrument.

Other objects of my invention and the invention itself will become more apparent by reference to the following description of certain embodiments of my invention, and in which description reference will be had to the accompanying drawing illustrating the said embodiment.

Referring to the drawing.

Figure 1:
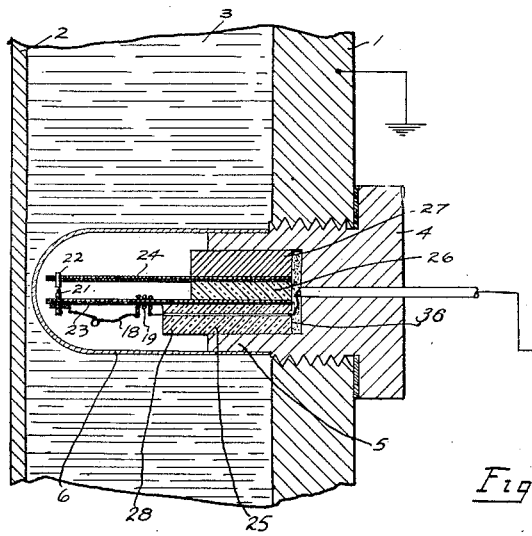
Fig. 1 illustrates partially diagrammatically, a system embodying the principles of my invention, applied to the purpose of indicating temperature of the water contained in the cooling jacket of an automotive engine, remotely thereof.
Figure 4:
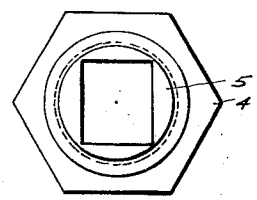
Fig. 4 is an end elevational view of the supporting block for the controlling apparatus of Fig. 1, prior to the mounting of the apparatus thereon.

Referring now first to Figs. 1 and 4 of the drawing which illustrates a first embodiment of my invention, the cooling jacket of an automobile engine is shown therein as comprising an outer wall 1, an inner wall 2 with cooling water 3 circulating within the jacket. A screw plug 4 is shown as being screw threaded through a threaded aperture of the wall 1 to project its reduced end 5 into the cooling water 3.

A thin-walled metallic cap 6 is secured over the exterior of the reduced end 5 of the plug in a leak-proof manner. The plug is recessed at its inner end and within the recess certain heat and electrical insulating blocks and thermostatic bi-metallic strips are mounted, as later described, to provide a controlling mechanism for the system.

A heat indicator 7 which would ordinarilly be placed on the instrument board of the vehicle in the driving compartment thereof, is provided and comprises a hand 8 movable over a scale 9 having suitable graduating markings.

This scale may either be marked in degrees of temperature indicated or may be provided with spaced portions indicating "cool—normal—hot", or the like.

A thermally operable mechanism comprising a heat element 10, and thermostatic bi-metallic strip 11 with a compensating thermostatic strip 12, serves to actuate the hand 8 according to the electrically effected temperature communicated to the strip 11 by the heating element 10.

A source of electric current 13, which may be the usual automotive vehicle storage battery, is illustrated as is also an electrical switch 14, which may be the same usually employed to control the ignition circuit "ign".

Electrical circuit conductors 15, 16, 17 and 18, and heating windings 19 and 20, preferably of resistance wire, for the controller and indicator, are also included in serial circuit with said conductors, said switch and said source of current.

In operation, the circuit is controlled by a pair of electrical contacts 21 and 22 respectively mounted on the ends of a pair of bi-metallic thermally warpable strips 23 and 24, which preferably project in substantially parallel relation within the controller cap 6 from the recessed end 5 of the controller plug, being maintained in spaced relation by an end of each strip projected within the recess, heat and electrical insulating blocks 25 and 26 being also disposed within the recess on either side of the strip 23, and a third block 27 adapted to tightly bind the strips between the blocks 26 and 27 with the block 26 interposed between the strips.

The block 27 may be metallic and will preferably be of equal length to the insulating block 26, while the block 25 will project outwardly from the recessed end 5 of the plug to a greater distance than the other blocks, and a projecting portion 28, which contacts the outer surface of the strip 23, being provided to limit the warping movement of the strip 23 responsive to increases of temperature communicated to the strip 23.

The effect of the projecting portion 28 upon the strip 23, which warps in such a direction as to move its contact 21 away from the contact 22 upon increases of heat, is such as to reduce the amount of warping by decreasing the effective length of the strip heated.

The greater effective length of the strip 24 relative to the strip 23, to both of which heat will be communicated from the cooling water 3, is effective to cause a greater warping of the strip 24; and consequently when both strips are warped upon an increase of temperature of cooling water, the contact 22 carried by the strip 24 will soon overtake the more slowly moving contact 21, and an electrical circuit will be completed by the engagement of the contacts including the source of current, the said circuit conductors, the closed contacts of the said switch, and the windings 19 and 20 of the heating elements for the controller strip 23 and the indicator strip 11, respectively.

Electrical current passing through these heating windings will additionally heat the strip 23, causing increased warping thereof, and will heat the strip 11 of the indicator, also effecting warping of this strip. Warping movements of the strip 23 being thus accelerated by the electrical heating thereof, it will soon thereafter move its end to withdraw its carried contact 21 from engagement with the contact 22 of the longer strip, which receives heat only from the cooling jacket.

The electrical circuit being thus broken and the heating supplied to the strips 23 and 11 by their respective electrical heating elements 19 and 20, being gradually lost by conduction, radiation and convection, these strips will recede slightly from their ultimate warped forms, so that the electrical contacts 21—22 will be reclosed with consequent reheating by the electrical windings 19 and 20 and subsequent reopening of the contacts, ad infinitum, so long as the ignition switch is closed to maintain the electrical circuit.

Due to such intermittent operation of the contacts, pulses of electrical current will continuously be supplied to the heating elements and the heating element 10 will be heated to a degree depending upon the percentage of the time that current is flowing through its winding.

Both of the strips 23 and 11 together with their electrical heating elements are of such mass and have such heat storage capacity relative to the extent of their heat radiating surfaces that heat will be stored in the strips and continuously supplied from the heating elements carried thereby between pulses of electrical current. Therefore the indicator hand 8 will fluctuate but little, but will maintain a substantially average indication of the average heating effect communicated to the strip 11 during operation of the system.

The amount of this average heating effect will be commensurable with the amount of warping movement required by the strip 23 in order to break the contacts 21—22 and this, of course, is commensurable to the amount of movement of the contact 22 carried by the long strip 24, and is determined by the temperature of the cooling water.

Therefore the amount of movement of the hand 8 from the indicator scale will be commensurable to the temperature of the cooling water.

The hand 8 is shown as pivoted at 29 and its shorter end is bifurcated at 30 to receive an end of a bi-metallic thermostatic strip 12 which is joined at its other end to the free end of the electrically heated thermostatic strip 11 by the connecter 31, of heat insulating material.

Since both of the strips 11 and 12 are subject to changes of atmospheric temperatures, and it is desired that the hand 8 should be non-responsive to changes of atmospheric temperature, the strips 11 and 12 are oppositely disposed relative to the direction of warping effected by them upon increased temperatures, and their lengths, widths and thicknesses are so chosen that upon changes of atmospheric temperature, the free end of the compensating strip 12 will effect substantially no movement of the hand 8.

However, the electrical heating by the element 10 to the strip 11 is not similarly communicated to the strip 12 and the hand 8 will be moved by motion communicated by the strip 11 through the strip 12 to the hand whenever electrical heating of the strip 11 occurs.

Instead of effecting an increased warping, literally speaking, of the strips upon increased temperatures, the strips or either of them may be preformed to a warped shape and upon increased temperatures may be, literally, unwarped or caused to become more straightened, but the term "warp" as used herein, and in the claims, is intended to comprehend all changes in form of the strip or equivalent means because of changes of temperature thereof.

Although I have shown one means of effecting closure of the contacts, comprising a relative difference of length of the two strips while providing the less responsive strip with an additional heat energizing means under control of its contacts, I contemplate also that this may be accomplished by varying the thickness of the strips or other dimensions thereof, or the angularity of placement of the strips.

Figure 2:
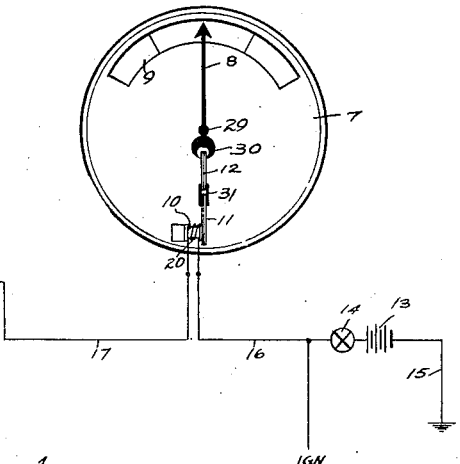
Fig. 2 is a side elevational view of a modified form of controller for the system of Fig. 1.
Figure 2:
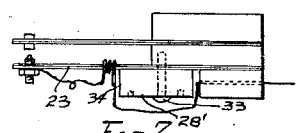
Figure 3:
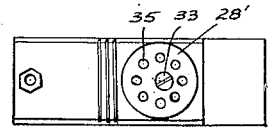
Fig. 3 is a bottom plan view of the controller of Fig. 2.

Referring now to Figs. 2 and 3, I show therein a modified form of controller apparatus wherein the insulating block projection 28 of the foregoing embodiment is replaced by an insulating block 28' which is eccentrically mounted on a pin 33 and is eccentrically rotatable on said pin to vary the extent to which its most forwardly disposed edge 34, projects under the electrically heated strip 23 to vary its responsiveness.

A series of recesses 35 is provided on its lower surface whereby a suitable tool may rotate the eccentric block 28' to adjustably vary the responsiveness of the strip 23.

It will be understood that the blocks 25 and 26 and 27 may be tightly pressed into the recesses of the plug 4, or may be secured therein in any other suitable manner.

A fluid-tight plastic filling 36 may be disposed within the end of the plug recess to seal the compartment within the cap 6. The cap 6 may also be tightly driven on to the reduced end 5 of the plug in leak-proof manner or may be screw threaded thereon or soldered or otherwise fixed thereto in leak-proof relation.

Having thus described my invention in certain embodiments I am aware that numerous and extensive departures may be made from the em- bodiments herein illustrated and described but without departing from the spirit of my invention.

I claim:

1. In a thermally responsive electric controller of the impulse transmitting type described, a walled chamber support adapted to be projected into a fluid container, a pair of bi-metallic elements mounted on the support and having free portions extending into the chamber, one of said element free portions being relatively longer than the free portion of the other element, whereby the said longer free portion will bend to a greater degree than the other free portion for a given temperature change, each of said element free portions carrying an electric contact adjacent the free end thereof, an electric heating element movingly associated with the shorter free portion element, a source of current, an electric circuit including the contacts and the heating element, the elements being bendable in the same direction responsive to temperature variation whereby the contacts may be engaged to energize the heater circuit accelerating the bending of the element associated with the heater to disengage the contacts effecting a series of current impulses whose cumulative value in a given interval is in correspondence with the temperature during that interval.

2. In a thermally responsive electric controller of the impulse transmitting type described, the combination of a walled chamber comprising a support and having a portion adapted to be projected into a fluid container, a pair of bi-metallic thermally warpable strips each fixedly secured to the support and having movable portions extending into the said chamber portion and exposed to temperatures communicated thereto by the fluid in the container, a pair of electric contacts within the chamber each so disposed as to be relatively movable responsive to and commensurably with relative movement of a different one of the said movable strip portions, one of said strips being relatively so formed so as to effect a greater movement of its said movable portion responsive to a given temperature variation than the other strip, an electric heating element disposed thermally contiguously to the less thermally responsive strip so as to communicate heat thereto when said element is energized, a source of current, an electric circuit including said source, said contacts, and said heating element, whereby said heating element is intermittently energized under the control of said contacts to supply increments of additional heat thereto to increase its temperature so as to make the said less thermally responsive strip effect movement of its associated contact an amount equivalent to the movement imparted to the other contact by the more responsive strip.

3. In a thermally responsive electric controller of the impulse transmitting type described, the combination of a walled chamber comprising a support and having a portion adapted to be projected into a fluid container, a pair of bimetallic thermally responsive elements each fixedly secured to the support and having movable portions extending into the said chamber portion and exposed to temperatures communicated thereto by the fluid in the container, a pair of electric contacts within the chamber each so disposed as to be relatively movable responsive to and commensurably with relative movement of a different one of the said movable element portions, one of said elements being relatively so formed so as to effect a greater movement of its said movable portion responsive to a given temperature variation than the other element, an electric heating element disposed thermally contiguously to the less thermally responsive element so as to communicate heat thereto when said element is energized, a source of current, an electric circuit including said source, said contacts, and said heating element, whereby said heating element is intermittently energized under the control of said contacts to supply increments of additional heat thereto to increase its temperature so as to make the said less thermally responsive element effect movement of its associated contact an amount equivalent to the movement imparted to the other contact by the more responsive element.

EDWARD J. LEVY.